United States Patent [19]

Lohr et al.

[11] 4,451,576

[45] May 29, 1984

[54] MOLECULAR WEIGHT DISTRIBUTION AND MICROSTRUCTURE MODIFIERS FOR ELASTOMERS

[75] Inventors: Delmar F. Lohr, Akron, Ohio; Donald N. Schulz, Annandale, N.J.

[73] Assignee: The Firestone Tire & Rubber Company, Akron, Ohio

[21] Appl. No.: 505,161

[22] Filed: Jun. 17, 1983

Related U.S. Application Data

[63] Continuation of Ser. No. 262,664, May 11, 1981, abandoned.

[51] Int. Cl.³ .............................................. C08F 4/48
[52] U.S. Cl. .................................... 502/155; 526/180
[58] Field of Search .................... 526/180; 502/155; 544/253, 282

[56] References Cited

U.S. PATENT DOCUMENTS 3,652,564 3/1972 Ellis .................................... 544/282

FOREIGN PATENT DOCUMENTS 45-41226 12/1970 Japan.
1327464 8/1973 United Kingdom.

*Primary Examiner*—Paul R. Michl
*Attorney, Agent, or Firm*—Daniel N. Hall

[57] ABSTRACT

Specific catalyst modifiers, namely unsaturated diazobicyclo compounds in association with anionic initiators such as organo-lithium compounds are utilized during the polymerization of conjugated diene monomers and comonomers therewith to unexpectantly yield polymers or copolymers having a broad molecular weight distribution, a significant vinyl microstructure, and good processability.

5 Claims, No Drawings

MOLECULAR WEIGHT DISTRIBUTION AND MICROSTRUCTURE MODIFIERS FOR ELASTOMERS

CROSS-REFERENCE

This is a continuation application of application Ser. No. 262,664 filed May 11, 1981, now abandoned.

TECHNICAL FIELD

The present invention relates to producing elastomers made from conjugated dienes such as butadiene which have a broad molecular weight distribution and a significant vinyl microstructure by utilizing unsaturated diazobicyclo compounds and anionic initiators during the polymerization of the monomers.

BACKGROUND ART

Heretofore, vinyl microstructured polymers made from conjugated dienes with or without comonomers such as vinyl substituted aromatics have been made utilizing anionic polymerizations with an alkyllithium compound as catalysts in hydrocarbon solvents. However, the polymer molecular weight distribution is narrow, that is $\overline{M}_w/\overline{M}_n$ has been small, generally less than 1.3 for polymers prepared at 70° C. or less. Various polar modifiers have been used to increase the polymer vinyl contents without significantly changing the polymer $\overline{M}_w/\overline{M}_n$. A broad molecular weight distribution results in good processability.

In an article entitled Temperature and Concentration Effects on Polar-Modified Alkyllithium Polymerizations and Copolymerizations by Antkowiak, Oberster, Halasa, and Tate, JOURNAL OF POLYMER SCIENCE, Part A-1, Vol. 10, 1319–1334 (1972), John Wiley and Sons, Inc., the addition of polar modifiers to alkyllithium-initiated homopolymerizations of butadiene caused substantial changes in the microstructure. The changes depended not only upon the concentration of the modifier, the ratio of the modifier to the alkyllithium catalysts, but also on the polymerization temperatures. The polar compounds generally were ethers, amines, and sulfides with various specific compounds being tetrahydrofuran, DABCO, 1,2-diazobicyclo(2.2.2)octane, a saturated compound. Another group of modifiers included the various di-, tri-, and tetraethylene glycol dimethyl ethers (for example, diglyme, triglyme, and tetraglyme). Although the amount of vinyl microstructure was improved at various temperatures, the article lacks any suggestion of catalyst modifiers, of increasing the molecular weight distribution of the polymers, and increasing the vinyl structure, and also fails to suggest the use of unsaturated diazobicyclo compounds.

The article by Oberster and Bebb, Solution Styrene Butadiene Copolymers with Lithium Alkyl Initiators, DIE ANGEWANDTE MAKROMOLEKULARE CHEMIE, Band 16/17 (1971) 297–308 (Nr. 224) Germany, relates to the solution polymerization of butadiene and styrene-butadiene copolymers with alkyllithium catalysts. Polar modifiers such as ethers, amines, and the like such as diglyme (diethylene glycol dimethyl ether) are used to modify the microstructure. Although the molecular weight distribution is reported as being broad, the actual distribution ($\overline{M}_w/\overline{M}_n$) is generally less than 1.3 at 70° C. and less than 2.5 for polymers prepared at temperatures in excess of 100° C. Furthermore, it is known that increasing the temperature of RLi polymerizations generally tends to broaden the $\overline{M}_w/\overline{M}_n$. When more moderate temperatures (e.g., 30°, 50° C.) are used [A. E. Oberster, T. C. Bouton, J. K. Valaitis, DIE ANGEWANDTE MAKROMOLEUKULARE CHEMIE 29/30 (1973) 291–305], the polymer molecular weight distributions are again narrow. In addition, the $\overline{M}_w/\overline{M}_n$ ratio for polymers prepared at −80° C. in the polar solvent THF are extremely low, i.e., 1.05–1.12 [M. Morton, A. A. Rembaum, J. L. Hall JOURNAL OF POLYMER SCIENCE A,1, 461 (1963)]. Hence, once again, applicants' catalyst modifiers, the achievement of a very broad molecular weight distribution, and a high vinyl structure are not suggested.

U.S. Pat. No. 3,498,960 to Wofford relates to the production of random copolymers of at least one conjugated diene and at least one monovinyl-substituted aromatic compound produced in an organolithium polymerization system by polymerizing the monomers in the presence of a hexahydro-1,3,5-trisubstituted-s-triazine randomizing agent. The random copolymers produced have a lower vinyl content than when other type randomizing agents are used. This invention does not result in any significant broadening of the molecular weight distribution of the polymers and completely fails to suggest applicants' unsaturated diazobicyclo compounds.

U.S. Pat. No. 3,639,380 to Screttas relates to the method of preparing microcrystalline waxes by the telomerization of ethylene in the presence of an aromatic or alkyl-aromatic hydrocarbon telogen such as benzene or toluene and of an organo-lithium-active ether complex such as butyllithium-tetrahydrofuran complex. Thus, the invention relates to the preparation of waxes, does not relate to the polymerization of conjugated dienes, and does not suggest utilization of applicants' molecular weight distribution modifiers.

U.S. Pat. No. 3,644,314 to Onishi et al relates to the preparation of random copolymers by copolymerizing a conjugated diene, such as 1,3-butadiene and a vinyl substituted aromatic hydrocarbon such as styrene, by means of a catalyst system containing an organolithium compound and a pyridine compound having two or more substituted hydrocarbon radicals. The pyridine catalyst is a completely different compound than that utilized in the present invention and does not relate to increased molecular weight distribution.

U.S. Pat. No. 3,776,893 to Naylor and Farrar relates to a polymerization process employing multifunctional initiators prepared by contacting organomonolithium compounds with selected compounds containing at least two carbon-carbon double bonds in the presence of polar compounds. The compounds containing two carbon-carbon double bonds are aliphatic hydrocarbons, alicyclic hydrocarbons, or tertiary nitrogen-containing heterocyclic compounds, with the polar compounds being alkali metal alkoxides, secondary and tertiary amines, or hexaalkylphosphoroamides. The polymerization of various monomers such as butadiene-styrene comonomers thus does not relate to applicants' modifiers, of elastomers having a high molecular weight distribution, but rather achieves a very low molecular weight distribution as set forth in Tables V and VI.

U.S. Pat. No. 3,966,691 to Halasa relates to a polymer made from conjugated dienes or a mixture of such a conjugated diene and a vinyl substituted aromatic monomer with the polymerization being carried out in a monomer-starved process to yield homopolymers or copolymers of low molecular weight containing from 35 to 95 percent of macrocyclic structures. The catalysts utilized are a combination of (1) zero-valent lithium, sodium, or potassium metals, or an alkyl derivative thereof, preferably in combination with (2) a chelating tert-diamine, such as N,N,N',N'-tetramethylene diamine, spartein or a saturated bicyclic amine such as DABCO (1,4-diazobicyclo[2,2,2]octane), i.e.,

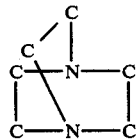

As apparent from the examples, a broad molecular weight distribution is often obtained. However, the preparation requires the handling of hazardous sodium or other alkaline metals, and their attended problems. Moreover, this patent completely fails to teach or suggest the unsaturated diazobicyclo compounds of the present invention.

DISCLOSURE OF INVENTION

The molecular weight distribution, that is the ratio of the weight average molecular weight to the number average molecular weight of elastomers made from conjugated dienes, is significantly and unexpectedly broadened by the use of an unsaturated diazobicyclo compound in association with an organo-lithium initiator during polymerization. The conjugated diene desirably is butadiene and can be copolymerized with a vinyl substituted aromatic monomer such as styrene. Not only does the polymer contain a medium vinyl content, but the molecular weight distribution varies from the 1.7 to about 30. The polymer has good processability and when polybutadiene is produced, it has the same glass transition point as conventional styrene-butadiene rubber, as well as wear and traction properties similar to styrene-butadiene rubber. A desired use is thus as an inexpensive replacement for styrene-butadiene rubber. Specific catalyst modifier compounds of the present invention include 1,5-diazobicyclo[4.3.0]non-5ene, i.e.,

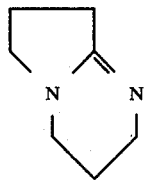

and 1,5-diazobicyclo[5.4.0]undec-5-ene, i.e.,

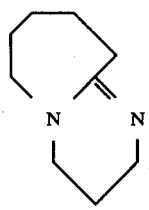

commonly referred to as DBN and DBU, respectively. The polymerization can occur over a wide temperature range, generally under pressure, with the molar amount of modifier generally being equal to or greater than the molar amount of the organo-lithium initiator.

In general, an organo-lithium catalyst modifier for producing a broad molecular weight distributed elastomer, comprises: a compound having the formula

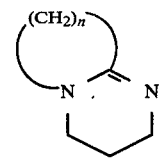

where n is from 3 to 6.

Additionally, an elastomer having a wide molecular weight distribution, comprising: the elastomer, said elastomer made by the anionic polymerization of monomers selected from the group consisting of (1) conjugated dienes having from 4 to 8 carbon atoms, (2) monomers of conjugated dienes having from 4 to 8 carbon atoms and vinyl substituted aromatic compounds having from 8 to 12 carbon atoms, (3) monomers of conjugated dienes having from 4 to 8 carbon atoms with themselves so that interpolymers are formed, and (4) combinations thereof; said elastomer produced utilizing a molecular weight distribution modifying compound and an organo-lithium compound during polymerization; said modifier being an unsaturated diazobicyclo compound having the formula

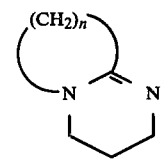

where n is 3 to 6, and wherein a sufficient amount of said diazobicyclic and said organo-lithium compound is utilized so that an elastomer having a broad molecular weight distribution is produced.

In general, a process for producing an elastomer having a broad molecular weight distribution, comprising the steps of: adding a molecular weight distribution modifier and an organo-lithium compound to an elastomer forming monomer, said monomer selected from the group consisting of (1) a conjugated diene having from 4 to 8 carbon atoms, (2) monomers of a diene having from 4 to 8 carbon atoms and a vinyl substituted aromatic compound having from 8 to 12 carbon atoms, (3) monomers of conjugated dienes having 4 to 8 carbon atoms with themselves so that interpolymers are formed, and (4) combinations thereof, said modifier compound being an unsaturated diazobicyclo compound having the formula

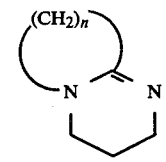

where n is 3 to 6, the amount of said modifier and said organo-lithium compound being sufficient to effect a molecular weight distribution upon polymerization; and anionically polymerizing said monomers to produce an elastomer having a broad molecular weight distribution.

BEST MODE FOR CARRYING OUT THE INVENTION

The broad molecular weight elastomers of the present invention are made from conventional or known monomers. For example, the monomers which are polymerized utilizing catalyst modifiers of the present invention can be conjugated dienes having from 4 to 8 carbon atoms, and preferably the conjugated dienes having from 4 to 6 carbon atoms. Examples of such conjugated dienes include butadiene, isoprene, 2,3-dimethyl-1,3-butadiene, 2-methyl-1,3-pentadiene, 3,4-dimethyl-1,3-hexadiene, and the like. Of these compounds, generally butadiene is preferred.

The conjugated dienes may be copolymerized with themselves to form interpolymers, for example, a copolymer of isoprene and butadiene, etc., or with aromatic compounds containing from 8 to 12 carbon atoms. Examples of specific vinyl substituted aromatic compounds include styrene, 1-vinylnaphthalene, 2-vinylnaphthalene, and the alkyl, cycloalkyl, aryl, alkaryl, and the aralkyl derivatives thereof. Examples of such compounds include 3-methylstyrene-vinyltoluene, styrene, alpha-methylstyrene, 4-n-propylstyrene, and the like. Of these compounds, alpha-methylstyrene is preferred with styrene being highly preferred.

The conjugated dienes and, if utilized, the vinyl substituted aromatic compounds, are anionically polymerized utilizing conventional organo-lithium initiators known to the art. Hence, the compounds can be represented by the formula RLi where R is a hydrocarbon radical selected from the group consisting of aliphatic, cycloaliphatic, aromatic, and alkyl substituted aromatic radicals containing from 1 to 30 carbon atoms per molecule. Usually R is an alkyl having from 1 to 12 carbon atoms, and preferably from 1 to 6 carbon atoms. The cycloalkyls have from 4 to 8 carbon atoms and preferably from 4 to 6 carbon atoms. The aromatic compounds have from 6 to 10 carbon atoms, whereas the alkyl substituted aromatics have from 7 to 20 carbon atoms and preferably from 7 to 12 carbon atoms. Examples of specific initiators include methyllithium, n-butyllithium, n-amyllithium, n-decyllithium, phenyllithium, naphthyllithium, p-tolylithium, 9-fluorenyllithium, cyclohexyllithium, and the like, with n-butyllithium being highly preferred. The essential features of these initiators is that they possess a carbon lithium bond which acts as a point of initiation for the polymerization. The amount of initiator or catalyst ranges from about 0.1 millimoles to about 5 millimoles and preferably from about 0.4 millimoles to about 1.5 millimoles per 100 grams of monomer.

It has been unexpectedly found that a very large increase in the molecular weight distribution of polymers made from the above-noted monomers or comonomers is obtained, if an unsaturated diazobicyclo compound having the formula

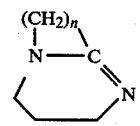

where n is 3 to 6, is utilized with the organo-alkali initiator. Specific examples of diazobicyclo compounds include 1,5-diazobicyclo[4.3.0]non-5-ene (DBN), 1,5-diazobicyclo[5.4.0]undec-5-ene (DBU), and the like. The latter compound (DBU) is desired, with the former compound (DBH) being highly preferred. These compounds are commercially available and can be obtained at least through the Aldrich Chemical Company.

The mole ratio of the modifier to the organo-lithium initiator or catalyst should generally range from about 0.5 to about 10, and preferably ranges from about 1.0 to about 2.5. The total amount of modifier utilized per 100 grams of monomer generally ranges from about 0.1 to about 10 millimoles with from about 0.2 to about 2 millimoles being preferred.

With regard to the anionic polymerization, the monomer(s) is first added to the reaction vessel, followed by the modifier and the anionic initiator. During the anionic polymerization, the temperature range generally ranges from about −80° C. to about 250° C. with a desired range being of from about 0° C. to about 150° C., preferably from about 200° C. to about 125° C. During the polymerization, it has been found that pressure is governed by the partial pressures of the solvent and monomers. Generally, any solvent which is generally inert with regard to the monomers, as well as the molecular weight distribution modifier, and the initiator can be utilized. Examples of such solvents include heptane, toluene, hexane, and the like. Of these solvents, hexane is preferred.

Through the use of the diazobicyclo monomers with the initiators, a medium amount of vinyl, that is 1,2-microstructure, is produced. That is, from about 15 to about 80 percent of all possible double bond units are of the 1,2- type structure. Desirably, from about 35 to about 65 percent is produced. Moreover, an unexpected and synergistic result has been found in that the molecular weight distribution, that is the ratio of the weight average molecular weight to the number average molecular weight will vary generally from about 1.7 to about 30. More specifically, when DBN is utilized at polymerization temperatures of from about 0° C. to about 20° C., the distribution will range from about 1.5 to about 5.0 with a range of from about 1.7 to about 2.7 being preferred. However, when the temperature is above 20° C., as up to about 125° C., the distribution is from about 3.0 to about 30, with from about 3.5 to about 15 being preferred. When DBU is utilized, the molecular weight distribution ranges from about 2.0 to about 5, with from about 2.0 to about 3 being preferred at temperatures of from about 0° C. to about 70° C. These molecular weight distributions are greater than that produced by prior art modifiers at the same temperatures.

Such broad molecular weight distribution imparts good processability to the elastomer or the elastomer copolymer and permits ready mixing, milling, calendaring, and the like of the elastomers with other rubber components such as compounding aids, processing aids, antioxidants, carbon black, and the like. Moreover, the elastomer is readily mixed, milled, etc., with conventional rubber stocks. The elastomers having the broad molecular weight distribution also have improved properties. For example, a polybutadiene produced according to the present invention with a medium vinyl content will have the same glass transition temperature as conventional styrene-butadiene rubber. Additionally, it has generally the same wear and traction properties as styrene-butadiene rubber and thus can be used as a substitute therefor (e.g., tire tread) since it is less expensive.

The invention will be better understood by reference to the following examples.

EXAMPLES

To a 28 ounce nitrogen purged beverage bottle was added an amount of monomer as set forth in Table I. To the monomer was added the indicated amount of modifier as well as the anionic initiator. The reaction was carried out in a constant temperature bath of indicated temperature and the following results were obtained.

TABLE I

|   | BUTADIENE GRAMS | STYRENE GRAMS | MILLI MOLES MODIFIER | MILLI MOLES n BuLi | TEMP. °C. | % CONVERSION | MWD | % VINYL | % BLOCK |
|---|---|---|---|---|---|---|---|---|---|
| A | 57.7 | — | .76 (DBN) | .38 | 30 | — | 25.7 | 50.9 | — |
| B | 60.5 | — | .80 (DBN) | .40 | 50 | — | 7.15 | 47.0 | — |
| C | 60.4 | — | .80 (DBN) | .40 | 70 | — | 3.94 | 43.6 | — |
| D | 62.9 | — | .84 (DBU) | .42 | 5 | — | 2.08 | 67.9 | — |
| E | 59.7 | — | .80 (DBU) | .40 | 20 | — | 2.66 | 56.0 | — |
| F | 57.5 | — | .76 (DBU) | .38 | 50 | — | 2.17 | 60.9 | — |
| G | 58.5 | — | .78 (DBU) | .39 | 70 | — | 2.06 | 55.0 | — |
| Control | 72 | — | TEA | 1.75 | 50 | — | 1.11 | 9.3 | — |
| Control | 72 | — | TEA | .175 | 50 | — | 1.14 | 9.7 | — |

TEA = Triethylamine

As apparent from Table I, the molecular weight distribution of the homopolymer, that is polybutadiene, was vastly increased as compared to the controls. Moreover, the percent of vinyl was also dramatically increased. Whereas very unexpected and large improvements of molecular weight distribution were obtained utilizing DBU, the increase utilizing DBN was very, very unexpected and a tremendous improvement.

TABLE II

|   | BUTADIENE GRAMS | STYRENE GRAMS | MILLI MOLES MODIFIER | MILLI MOLES n BuLi | TEMP. °C. | % CONVERSION | MWD | % VINYL | % BLOCK |
|---|---|---|---|---|---|---|---|---|---|
| Control | 47.4 | 20.0 | TEA | .70 | 70 | 81.5 | 1.65 | 10.1 | 64.5 |
| H | 47.4 | 20.0 | .71 (DBN) | .70 | 70 | 80.4 | 5.1 | 42.8 | none |

TEA—Triethylamine

As apparent from Table II, when DBN was utilized as a catalyst modifier, a dramatic increase in the molecular weight distribution was obtained as was the amount of vinyl content in the copolymer in comparison to the control. Moreover, it is further noted that the copolymer was randomized in that it did not contain block portions as in the control.

While in accordance with the patent statutes, a best mode and preferred embodiment has been set forth, the invention is not limited thereto, the scope of the invention being measured by the scope of the attached claims.

What is claimed is:

1. An elastomeric molecular weight distribution modifier, comprising:

a modifier compound having the formula

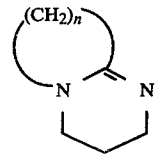

where n is from 3 to 6;

said compound utilized in the polymerization of elastomer-forming monomers and, an organo-lithium compound, said modifier modifying said organo-lithium compound to produce a broad molecular weight distribution in an elastomer of from about 1.7 to about 30.

2. An elastomeric molecular weight distribution modifier according to claim 1, wherein said organo-lithium catalyst has the formula RLi where R is an aliphatic, a cycloaliphatic, an aromatic, or a substituted alkyl aromatic, or combinations thereof, having from 1 to 30 carbon atoms, wherein the mole ratio of said modifier to said RLi is from about 0.5 to about 10.0, and wherein the amount of said modifier is from about 0.1 to about 10 millimoles per 100 grams of said monomer.

3. An elastomeric molecular weight distribution modifier according to claim 2, wherein R is an alkyl having from 1 to 12 carbon atoms, a cycloalkyl having from 4 to 8 carbon atoms, an aromatic having from 6 to 10 carbon atoms, or an alkyl substituted aromatic having from 7 to 20 carbon atoms.

4. An elastomeric molecular weight distribution modifier according to claim 3, wherein n is 3 or 5, and wherein said molecular weight distribution is from about 1.5 to about 5.0 when n is 3 and said polymerization is carried out at a temperature of from about 0° C. to about 20° C., wherein said molecular weight distribution is from about 3.0 to about 30 when n is 3 and said polymerization temperature is from about 20° C. to about 125° C., and wherein said molecular weight distribution is from about 2.0 to about 5 when n is 5.0 and said polymerization temperature is from about 0° C. to about 70° C.

5. An elastomeric molecular weight distribution modifier according to claim 4, wherein RLi is butyllithium, and wherein the mole ratio of said modifier to said lithium compound is from about 1.0 to about 2.5, and wherein the amount of modifier is from about 0.2 to about 2.0 millimoles per 100 grams of said monomer.

* * * * *